July 16, 1940.  L. M. PERSONS  2,207,942
STOKER CONTROL
Filed July 3, 1936  2 Sheets-Sheet 1
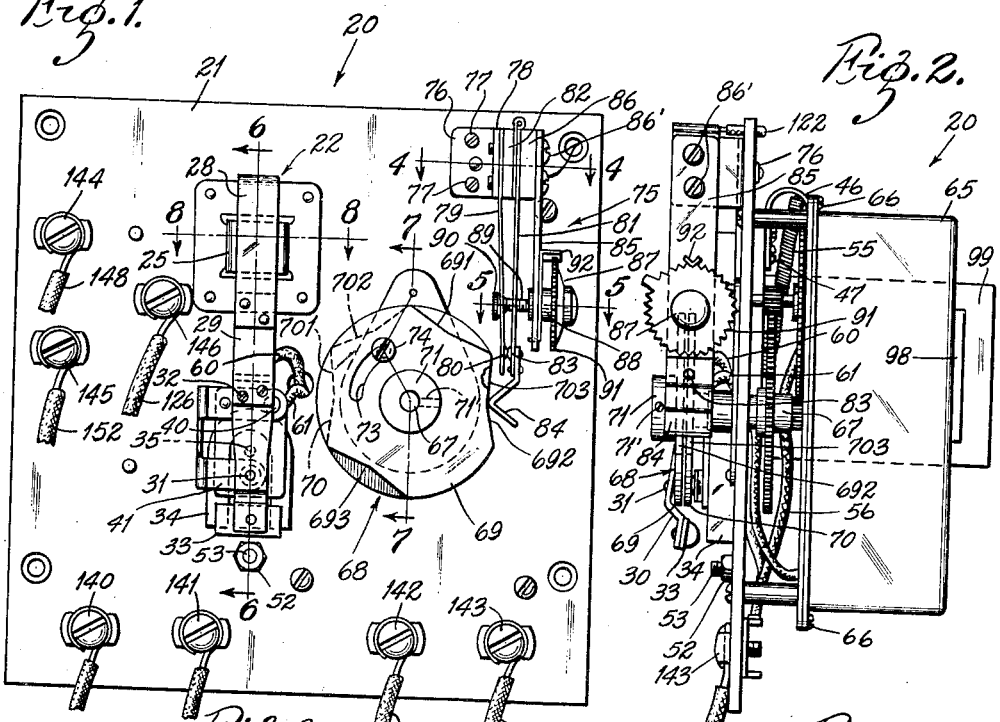
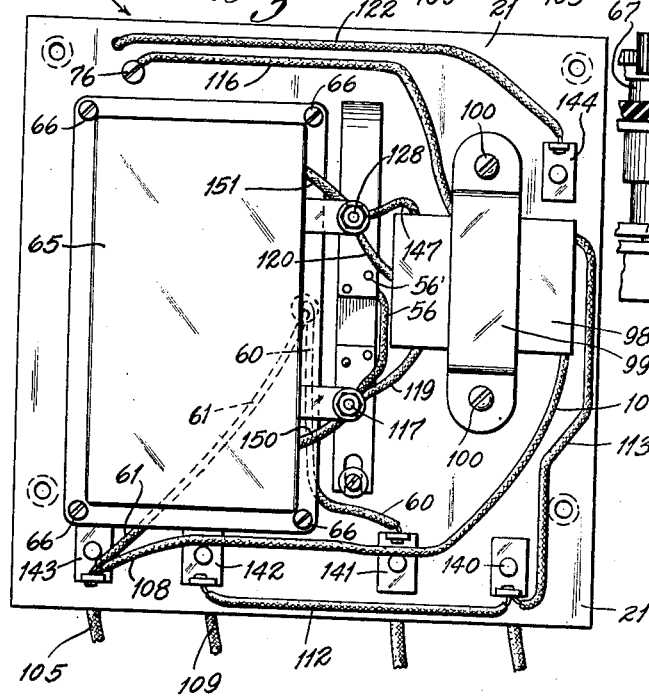
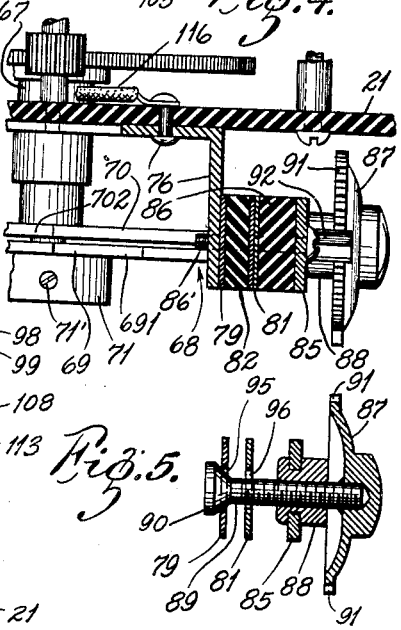
INVENTOR
LAWRENCE M. PERSONS,
By Lawrence La Kingsland
ATTORNEY July 16, 1940.　　　L. M. PERSONS　　　2,207,942
STOKER CONTROL
Filed July 3, 1936　　　2 Sheets-Sheet 2
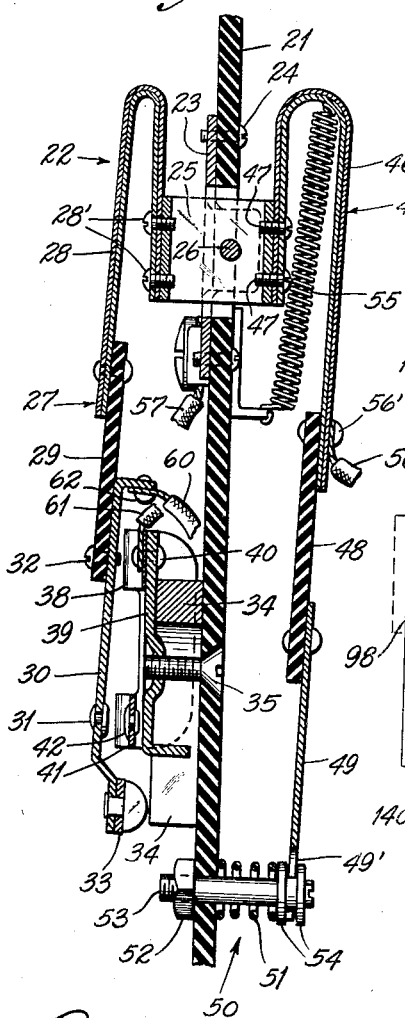
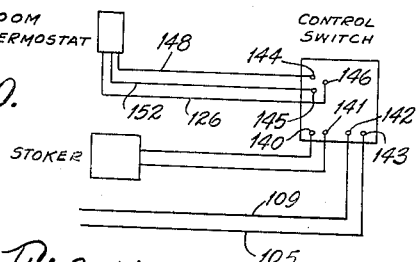
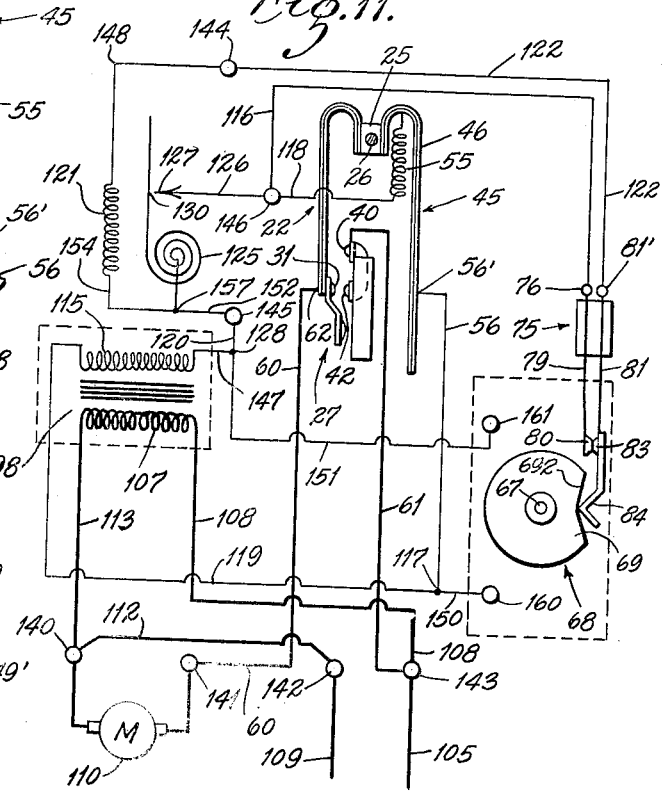
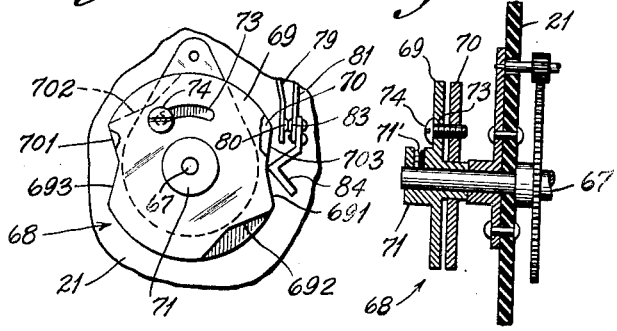
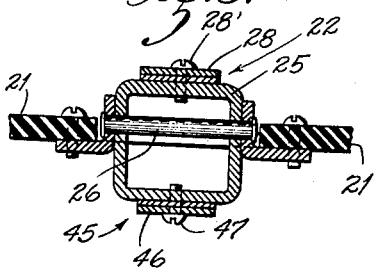
INVENTOR:
LAWRENCE M. PERSONS,
By Lawrence C. Kingsland
ATTORNEY.

Patented July 16, 1940

2,207,942

UNITED STATES PATENT OFFICE 2,207,942

STOKER CONTROL

Lawrence M. Persons, St. Louis, Mo., assignor, by mesne assignments, to Automatic Control Corporation, St. Louis, Mo., a corporation of Delaware Application July 3, 1936, Serial No. 88,714

11 Claims. (Cl. 236—46)

The present invention relates to a mechanism and means for operating the same by a timed control and by a temperature control. In particular, it is applicable to stoker control mechanism including a relay selectively energized by timed or thermostat means for predeterminedly operating the motor of a stoker used with coal furnaces, and the like.

An object of the invention is to provide a motor or other similar mechanism, and two control devices operable to close the motor circuit, with means to render one of them inoperative during operation of the other.

Another object is to provide specifically a stoker control mechanism which includes, in cooperating relation, both a clock and a thermostatic means for selectively energizing a relay to close a switch to actuate a motor for feeding coal, or the like, to furnaces.

A further object is to provide a motor or other similar mechanism, with a temperature-responsive and a time-actuated means to control the operation of the motor, together with means rendering the temperature-responsive means inoperative during operation of the time-actuated means.

Another object is to provide a stoker control including a low voltage relay for controlling a high voltage line in which a stoker motor is connected.

Another object is to provide a stoker control which includes both time and thermostat circuits as part of a relay, the thermostat having a biasing heater element associated therewith which is energized by current passing through the time control circuit to prevent closing of the thermostat circuit during or just following the passage of current through the time circuit.

Another object is to provide a novel double cam for use as a part of a time control assemblage.

Another object is to provide a novel double cam, and associated adjustable contact means actuated by the cam for use with a time control mechanism.

Other objects and advantages will appear from the following description, taken in conjunction with the accompanying drawings, wherein Fig. 1 is a plan view of a stoker line switch mounted as a unit with a time control relay and voltage reducing transformer.

Fig. 2 is a side elevation of the assemblage of Fig. 1.

Fig. 3 is a rear view of the assemblage shown in Fig. 1.

Fig. 4 is a section on the line 4—4 of Fig. 1.
Fig. 5 is a section on the line 5—5 of Fig. 1.
Fig. 6 is a section on the line 6—6 of Fig. 1.
Fig. 7 is a section on the line 7—7 of Fig. 1.
Fig. 8 is a section on the line 8—8 of Fig. 1.
Fig. 9 is a plan view of the adjustable cam assemblage used as part of the time control mechanism.

Fig. 10 is a diagrammatic view showing the relation of the stoker, the stoker line switch, the time control relay, and the room thermostat relay.

Fig. 11 is a wiring diagram which discloses in detail the main motor control circuit and the time and thermostat relay circuits which control the opening and closing of a switch in the main stoker motor circuit.

Referring more particularly to the drawings by reference numerals, 20 indicates generally an assemblage which includes as a compact unit a line switch for a stoker motor, or the like, a time controlled relay therefor, and a transformer unit. A room thermostat unit is disposed in a room, or the like, operable by heat changes therein, and is wired into the time relay to cooperate therewith to selectively control the switch, as will be explained hereinafter. A base 21 of non-conducting material supports the various elements of the assemblage.

The line switch 22 is described in detail in my copending application Serial No. 79,053, filed May 11, 1936, Patent No. 2,159,342, May 23, 1939. It includes a plate 23 connected to the base 21 by screws 24, or the like, which supports a pivot block 25 by a pin 26 journaled therein. A contact-carrying member generally indicated 27 having a U-shaped bimetallic element 28 is connected by screws 28', or the like, to the pivot block. The member 27 also has an insulating connecting portion 29 and a switch blade 30 carrying a contact 31 which are connected by a screw 32, or the like. The switch blade carries at the end remote from this connection a relatively permeable element 33 which is adapted to move between the legs of a U-shaped permanent magnet 34 connected by a screw 35, or the like, to the base 21. A switch plate 38 is supported on a switch backing plate 39 at a fixed connection 40, which also serves as a terminal. The plate 39 is fixed relative to the base 21 by means of the aforesaid screw 35. The switch plate 38 includes a relatively movable portion 41 which carries a contact 42 adapted to cooperate with the contact 31. There is opposed to the contact-carrying member 27 a member generally indicated 45 which is of a construction similar thereto, and includes a U-shaped bimetallic element 46 connected to the pivot block by screws 47, or the like; an insulating portion 48; and a connecting element 49. The element 49 is secured in position relative to the base 21 by adjustable nut and pin means 50, or the like, which includes a spring 51, a nut 52, a pin 53, and spaced fixed washer elements 54. The element 49 is slotted at 49' to allow for longitudinal movement of the member 45 during expansion or contraction of the bimetallic element 46. A heater coil 55 is disposed adjacent the bimetallic element 46 and is connected in series therewith. Leads 56 and 57 serve to connect the heater in a circuit to be hereinafter described. Leads 60 and 61 are adapted to connect the switch in a motor circuit, which will be hereinafter referred to, the lead 60 being connected to the switch blade 30 at the terminal 62, and the lead 61 to the switch plate 38 at the terminal 40. The heater 55 affects only the bimetallic element 46, and is insulated from the bimetallic element 28 by the base 21, this latter element 28 being a compensating thermal member obviating the effect of ambient air temperatures, and is equal and opposite in its action to the element 46.

Also supported by the base 21 is a time control relay mechanism, which includes an electric clock 65 which is connected to the rear of the base 21 by screws 66, or the like. A shaft 67 is operatively connected to the clock and extends through the base 21. The shaft 67 makes one full rotation in an hour in a normal timed setting, though this movement may be varied.

An adjustable double cam 68 is fixed to the shaft 67, and includes one element 69 of a configuration shown in Figs. 1 and 9 in full lines, and a second element 70 of a configuration shown in Figs. 1 and 9 in dash lines. The element 69 includes a hub 71 having an associated set screw 71' by means of which it is fixed to the shaft 67 and the element 70 is rotatable about this hub.

The cam elements 69 and 70 are identical in contour, each being provided with the same indenations, although the elements, in place, are turned 180° from a position of coincidence. By thus employing two identical elements, manufacturing expense is reduced. The object of this double cam is to provide for either one or two operations of the cam follower switch, for each revolution of the cam.

The element 69 is provided with three V-shaped peripheral indentations 691, 692, and 693, the designations running consecutively clockwise from the larger arcuate portion. The element 70 is provided with three V-shaped indentations 701, 702, and 703, correspondingly designated. The elements are faced together in such position that the larger arcuate portions are diametrically opposite each other. The element 69 has an arcuate slot 73 therein through which a screw 74 passes, the screw being threaded into the element 70. This slot is of an arcuate length in degrees equal to the arcuate length of one indentation.

In the position of Fig. 1, the elements are adjusted so that only one indentation is present in the cam. In this position, the indentations 692 and 703 are made to coincide. However, the indentations 691 and 693 are opposite arcuate portions of the element 70, and hence neither is effective. In the position of Fig. 9, two indentations are made to coincide, the elements having been shifted until the screw 74 engages the opposite end of the slot 73. In this position, the indentations 691 and 693 of the element 69 register with the indentations 703 and 701, respectively, of the element 70. These respective pairs of indentations are diametrically opposite, so that two equally spaced operations of the cam follower switch occur during a single revolution of the cam. In either position of operation, the screw 74 is turned down to maintain the elements together as adjusted.

The cam in its rotation through movement of the shaft 67 is adapted to make and break the contacts in an associated switch assemblage, generally indicated 75. The switch 75 includes a supporting bracket 76 secured to the base 21 by screws 77, or the like, having an upstanding portion 78. The bracket 76 serves as a terminal post for a switch blade, described below. A resilient blade 79 is secured to the upstanding portion 78, and carries at an end remote therefrom a contact 80. A relatively movable resilient blade 81 is fixed to the portion 78 of the bracket, insulated from the blade 79 by means 82, and carries at the end remote therefrom a contact 83 and a V-shaped element 84. The contact 83 is adapted to cooperate with the contact 80. A rigid supporting arm 85 is fixed at one end to the upstanding portion 78 of the bracket in insulating relation to the blades 79 and 81 by insulating means 86, and carries at its other end a screw adjustment 87 which is adapted to selectively position the blade 79 relative to the arm 85 and, therefore, to the blade 81. Screws 86', or the like, maintain the blades 79 and 81 and the arm 85 fixed to the portion 78. The adjustment includes an internally threaded sleeve 88 fixed relative to the arm 85; a screw 89 threadedly engaged in the sleeve having a head 90 at one end and a serrated wheel 91 fixed to the other end; and a detent 92 fixed to the arm 85 and serving to maintain the wheel 91 in selected position. The blades 79 and 81 have slots 95 and 96, respectively, therein through which the screw 89 extends. The head 90 abuts the remote side of the blade 79 at the slot 95, in a manner to draw the said blade towards the arm 85, whereas the blade 81 has free movement relative to the screw 89.

It is thus apparent that rotation of the wheel 91 serves to move the blade 79 towards the arm 85 and therefore towards the blade 81, movement of the blade in the opposite direction being effected by the above noted inherent resiliency of the blade 79, whereby the follower 84 is maintained against the cam. Thus, the switch contacts 80 and 83 may close at any selected point in the movement of the blade 81 radially of the cam 68.

Likewise supported upon the base 21 is a transformer unit 98, the details of which are not shown, inasmuch as they form, per se, no particular part of the present invention. The transformer is held in place against the rear portion of the plate 21 by means of a U-strap 99 which is fixed to the base by screws 100, or the like. This transformer reduces the line voltage.

The details of the room thermostat are not disclosed, inasmuch as they also form no part of the present invention as such; but a type similar to that disclosed in my copending application Serial No. 80,990, filed May 21, 1936, Patent No. 2,145,950, Feb. 7, 1939, may be employed.

In Fig. 11, there is diagrammatically shown the electrical interrelation between the stoker motor, the motor line switch, the transformer, the room thermostat, and the time control circuits. The circuit from the main line through the primary of the transformer and the circuit from the main line through the stoker motor and its line switch are in parallel. Likewise, the thermostat control circuit and the time control circuit, which constitute selectively operated relays to close the line switch, are in parallel. The circuits are traced as follows:

The two main power lines are 105 and 109, the former being connected to the terminal post 143, and the latter to the post 142. Connected directly across the line from these two terminals is the primary 107 of the transformer, the circuit being as follows: terminal 143, lead 108, primary 107, line 113, terminal 140, line 112, and terminal 142. The stoker motor 110 is likewise connected in parallel with the primary across the terminals 143 and 142, and in series with it is the switch 22. This circuit is traced as follows: terminal 143, lead 61, terminal 40, fixed contact 42, movable contact 31, terminal 62, lead 60, terminal 141, motor 110, terminal 140, line 112, and terminal 142. Thus, when the terminals 143 and 142 are connected to a power source, and the stoker motor connected to terminals 140 and 141, the primary 107 will be immediately energized, and the motor energizable upon closure of the switch 22.

The secondary circuits will now be explained. The secondary 115 of the transformer is connected at opposite ends to the inner terminals 117 and 128 of the mechanism. Constantly across these terminals is placed the electric clock mechanism, the same having terminals 160 and 161. The circuit is as follows: secondary terminal 117, lead 150, clock terminal 160 through the clock, clock terminal 161, line 151, and terminal 128. Since this circuit is always closed, there will always be a current flowing through the secondary 115.

Two additional secondary circuits, namely, the room thermostat circuit and the timed circuit, are connected in parallel with each other and with the clock, across the secondary. The room thermostat circuit is as follows: terminal 117, line 56, terminal 56', bimetallic element 46, heater 55, lead 118, terminal 146, lead 126 to the room thermostat, contact 127, thermostat switch 125, terminal 157, line 152, terminal 145, line 120 to terminal 128. Thus, it will be seen that the room thermostat is connected across the terminals 145 and 146 of the device, and that, when it is closed, the heater 55 will be energized.

The timed circuit is traced as follows: terminal 117, lead 56, contact 56', bimetallic element 46, heater 55, lead 118, terminal 146, lead 116, terminal 76, relatively fixed blade 79, contact 80, contact 83, movable blade 81, terminal 81', line 122, terminal 144, line 148, biasing heater 121, line 154, terminal 157, line 152, terminal 145, line 120, and terminal 128. Thus, the biasing heater from the room thermostat is connected across terminals 144 and 145, and will be energized when the clock-controlled switch is closed.

Thus, it is apparent that there has been provided a multiple control heat relay for controlling the motor of a furnace stoker. The above referred to biasing heater 121 is disposed in heat-supplying relation to the thermally-sensitive element of the room thermostat, and is connected in series with the circuit controlled by the clock mechanism. It is used to prevent the room thermostat from calling for firing action on the part of the stoker immediately after the stoker has been actuated by the time mechanism, as would be the case where the room temperature has dropped to the closing temperature of the room thermostat before the heat resultant of a load of coal supplied by the time mechanism could be carried to the room. The biasing heater raises the temperature of the switch during the energization of the time-controlled circuit, and keeps it from closing.

The use of the transformer 98 in the switch assemblage provides a means for securing a low voltage for the relay circuits and the biasing heater, which is an important feature of the invention.

It is, of course, obvious that energization of the heater element 55 produces heat to close the main line switch, no matter which relay circuit functions.

*Operation*

It is now apparent that the present invention contemplates controlling a stoker to prevent a coal fire from going out, even when the room temperature stays for a long period of time above that temperature which would normally close the room thermostat to actuate the stoker. It provides a time control relay which is adapted to cause the stoker to feed a supply of coal to the furnace once or twice every hour, depending upon the setting of the cam 68.

In using the device, the first adjustment is that of the cam. By loosening the screw 74, the element 70 is rotated relative to the element 69 to determine whether, as in Fig. 1, one notch is present, or, as in Fig. 9, two notches are present. Or, in other words, this cam is adjusted to determine whether one or two charges of coal shall be made every hour.

Next, the switch 75 is adjusted. The total arcuate extent of each cam notch may be about fifteen minutes, or one quarter of a revolution. It will be assumed that the switch is closed, the follower 84 being at the bottom of the V-notch, as shown in Figs. 1 and 9. Rotation of the cam moves the follower radially outward and ultimately breaks the contacts 80 and 83. Since a certain amount of this radial movement is required to produce a clear break in the contacts, a maximum of only about half the arcuate extent of the cam notch is available during which the switch is closed. The cam is rotated from this starting point until the lapse of one-half the time desired for operation of the stoker motor and, at this point, the wheel 91 is rotated until any further rotation of the cam will break the contacts. Thus, any desired time of operation of the stoker motor may be obtained by proper adjustment of the wheel 91.

With the device thus adjusted, the power lines connected to terminals 142 and 143, the motor connected to terminals 140 and 141, the room thermostat connected to terminals 145 and 146, and the biasing heater connected to terminals 144 and 145, the apparatus operates as follows: The primary 107 is excited, and causes excitation of the secondary, which, in turn, operates the clock. These circuits constantly remain thus.

After a certain time interval, the cam 69 will operate to close the switch 75, and the secondary circuit through it, the biasing heater 121, and the relay heater 55 will be energized. The relay heater 55 acts on the bimetal 46 to close the contact points 31 and 42 of the line switch 27, which completes the main line circuit through the motor 110 of the stoker. Simultaneously, the biasing heater 121 is excited to generate heat which maintains the bimetallic element of the thermostat switch 125 in open position so that the thermostat switch cannot close during this timed operation of the stoker, or immediately thereafterwards. Were the biasing heater 121 not used, on occasion the room thermostat would call for heat immediately after the stoker had been actuated by the time relay, for furnace heat is not supplied to a room simultaneously with firing of the furnace. This second charge of coal would cause the overheating of the room. The duration of this operation of the stoker by this time control is determined by the adjustment of the switch 75 by the wheel 91.

Should the room cool, the room thermostat may operate the stoker as follows: When the contacts 127 and 130 of the room thermostat close at drop of the temperature in the room, the thermostat relay is closed, and the heater 55 is energized to produce heat, which affects the bimetallic element 46 to close the contact points 31 and 42 of the line switch, thereby completing the stoker motor circuit to energize the motor, which actuates the stoker mechanism to fire the furnace. This circuit, of course, cannot operate if the thermostat is held open by heat from the biasing heater.

Inasmuch as the circuits, both main and relay, are traced in the detailed description of the device, they have not been retraced in the discussion of the operation of the device.

From the above description, considered with the accompanying drawings, it is apparent that there has been provided a novel automatic stoker control mechanism adapted to fulfill all of the objects and advantages enumerated and suggested.

It is to be understood that the above description and the accompanying drawings are given by way of illustration and example and not for limitation, the invention being limited only by the following claims.

What is claimed is:

1. In a device of the kind described, a thermally-sensitive switch, a thermostat-controlled circuit to operate the switch, and a time-controlled circuit to operate the switch, said latter circuit having in series therewith a biasing heater element which is disposed in heat-giving relation to the thermostat to prevent the thermostat from closing for a predetermined time after energization of the time-controlled circuit.

2. In a device of the kind described, a stoker motor, a switch in series therewith, a thermostat-controlled circuit to operate the switch, and a time-controlled circuit to operate the switch, said latter circuit including in series therewith a biasing heater which is disposed in heat-giving relation to the thermostat to prevent it from closing for a predetermined time after energization of the time-controlled circuit.

3. In a device of the kind described, a cam comprising two elements identical in peripheral contour, and a plurality of indentations on each contour, said indentations being so designed that when said elements are superposed, the cam may be provided with either one or a plurality of indentations by rotation of one element relative to the other, and means for maintaining the elements in adjusted position.

4. In a device of the kind described, a circular cam comprising two elements identical in peripheral contour, and a plurality of indentations on each contour, said indentations being so designed that when said elements are superposed, the cam may be provided with either one or a plurality of equally spaced indentations by rotation of one element relative to the other.

5. In a device of the kind described, a stoker motor and a switch in series in a high voltage line, a thermostat-controlled circuit and a time-controlled circuit to selectively operate the switch, a heater element in the latter circuit disposed to prevent operation of the thermostat just following energization of the time-controlled circuit, and means in parallel with the motor to step down the line voltage to supply low voltage for the circuits.

6. In a device of the kind described, a line circuit, a motor and a thermally-sensitive switch in series in the said circuit, a thermostat-controlled circuit and a time-controlled circuit to selectively operate the switch, said circuits being in parallel, a heater element in the time-controlled circuit disposed to prevent operation of the thermostat during or just following energization of the time-controlled circuit, and means to take high voltage current from the line and to supply low voltage current to the circuits.

7. In a mechanism of the kind described, a main circuit, two control circuits including a time actuated circuit and a thermally actuated circuit each adapted to energize or deenergize the main circuit, time means actuating said time-controlled circuit for a predetermined interval of time to operate said main circuit during said interval, and means put into operation by actuation of said time actuated circuit and acting upon the thermally actuated control circuit to render said latter control circuit inoperative to energize the main circuit for a predetermined period of time after the interval of actuation of the main circuit by said former control circuit.

8. In a mechanism for use with a furnace having an electrically operated device for causing the furnace to be heated, a time operated control circuit for putting said device into operation, a thermostat and a thermal control circuit for putting said device into operation, and a heater in the time operated circuit energized upon actuation of the said circuit, said heater being positioned adjacent the thermostat to prevent closing of the same when the time operated circuit is being actuated.

9. A stoker control including a motor, a circuit therefor and a time controlled switch in said circuit, said switch including a clock mechanism, a shaft rotated thereby, a pair of identical round elements one of which is adjustably secured to the shaft, each element having a plurality of V-notches in its periphery, two such notches being diametrically opposed and the third being adjacent one of the two, all of said notches subtending chords of the element equal to its radius, said two elements being superposed and the one being adjustable through sixty degrees over the other in such wise as to provide a cam having selectively one notch or two opposite notches, a follower, a contact thereon, means urging said follower against the cam, a switch blade adjacent the follower, and a second contact on the blade, said blade being adjustably maintained in a given position relative to the follower, whereby the depth the follower extends into the notches determines the closing of the contacts and the adjustment of the blade determines the period of time the contacts are closed, and consequently the period of operation of the stoker motor.

10. In a system of the kind described, a heat change producing device to be controlled, a circuit and a time-operated means in said circuit for controlling the device and causing periodical operation thereof, a circuit and a temperature responsive means in said circuit for controlling the device in response to temperature changes resulting from the heat change device, said last-named circuit being normally free of said time-operated means and adapted to operate continuously upon demand at the thermostat, and means rendered effective upon operation of the time-operated means to prevent operation of the temperature responsive means to close the circuit until an interval has elapsed after completion of operation of the time-operated means, whereby the heat change device may influence the temperature responsive device in accordance with its said operation by the time-controlled means.

11. In a system of the kind described, a heat change producing device to be controlled, a temperature responsive circuit including a thermostat subject to heat changes produced by the heat change producing device for effecting said control, a clock, an independent time-controlled circuit for additionally effecting said control, the temperature responsive circuit being normally free of the time-controlled circuit and adapted to operate continuously upon demand at the thermostat, said time-controlled circuit having in series a switch operated for a predetermined interval of time by the clock and a means to influence the temperature controlled circuit to prevent operation thereof for an interval after the interval of operation of the heat change producing device by the time-controlled circuit.

LAWRENCE M. PERSONS.